United States Patent
Dell'Aglio et al.

[19]

[11] Patent Number: 5,826,774
[45] Date of Patent: Oct. 27, 1998

[54] WIRE TENSIONER FOR DYNAMO-ELECTRIC MACHINE COIL WINDER

[75] Inventors: Gastone Dell'Aglio, Scandicci; Rossano Galassi; Federico Sbalchiero, both of Florence, all of Italy

[73] Assignee: Axis USA, Inc., Tampa, Fla.

[21] Appl. No.: 853,371

[22] Filed: May 8, 1997

Related U.S. Application Data

[60] Provisional application No. 60/020,486, May 30, 1996.

[51] Int. Cl.$^6$ .......................... B65H 26/00; B65H 23/00; B65H 59/10
[52] U.S. Cl. .......................... 226/44; 226/195; 242/411; 242/417.1; 242/419.1; 242/433.3
[58] Field of Search .............................. 242/411, 417.1, 242/419.1, 433.3; 226/39, 44, 45, 118.2, 195, 25

[56] References Cited

U.S. PATENT DOCUMENTS

| | | | |
|---|---|---|---|
| 1,475,855 | 11/1923 | Murdock | 242/419.1 |
| 3,326,436 | 6/1967 | Huck | 226/25 |
| 3,556,369 | 1/1971 | Ferguson | 226/25 |
| 3,556,373 | 1/1971 | Whitney | 226/195 X |
| 3,680,753 | 8/1972 | Shaw-Stewart | 226/44 X |
| 4,359,178 | 11/1982 | Hayashi et al. | 226/44 X |
| 4,858,835 | 8/1989 | Luciani et al. | |
| 5,257,745 | 11/1993 | Lombardi et al. | |
| 5,310,124 | 5/1994 | Linari et al. | |
| 5,383,619 | 1/1995 | Cardini et al. | |

FOREIGN PATENT DOCUMENTS

| | | |
|---|---|---|
| 0 618 661 A1 | 10/1994 | European Pat. Off. . |
| 0 703 658 A1 | 3/1996 | European Pat. Off. . |
| 2 337 094 | 7/1977 | France . |
| 2 170 186 | 7/1986 | United Kingdom . |
| 2 173 485 | 10/1986 | United Kingdom . |

*Primary Examiner*—Michael Mansen
*Attorney, Agent, or Firm*—Fish & Neave; Jeffrey H. Ingerman

[57] ABSTRACT

A tensioner for an armature winder which significantly reduces instantaneous increases in wire tension during winding or lead connection. System controls control the drag of a hysteresis brake, monitor wire tension via a load cell, and control a dancer arm's position through limit sensors and a closed-loop proportional valve (which regulates the pressure within an air cylinder coupled to the dancer arm). These system controls significantly reduce instantaneous increases in wire tension during winding, during the start of winding, and during lead connection. A wire breakage detection device also monitors the wire during winding and signals the system controls if wire breakage is detected. Upon such detection, a rapid discharge valve discharges the air cylinder, and flyer arm rotation is halted prior to the wire becoming unthreaded from the flyer arm.

13 Claims, 4 Drawing Sheets

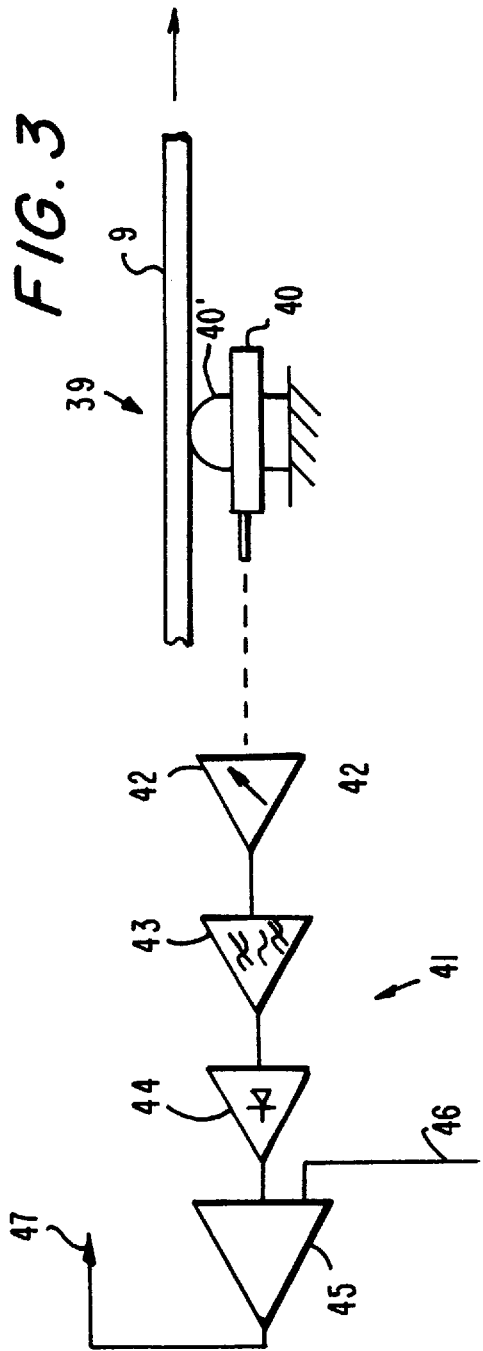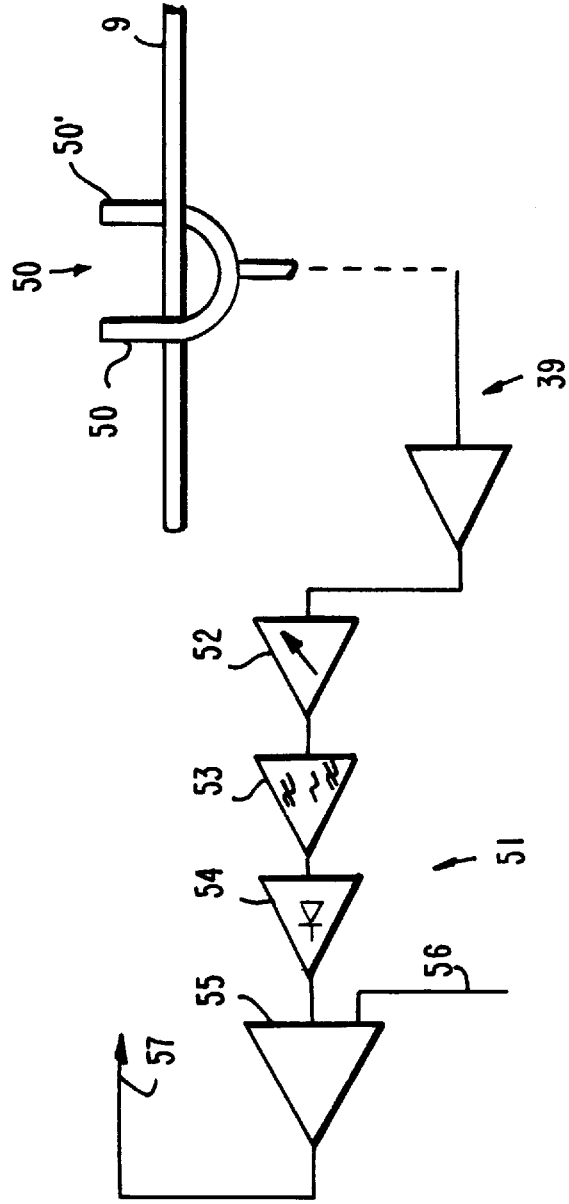

WIRE TENSIONER FOR DYNAMO-ELECTRIC MACHINE COIL WINDER

This application claims the benefit of U.S. provisional application No. 60/020,486, filed May 30, 1996, now abandoned.

BACKGROUND OF THE INVENTION

This invention relates to manufacturing equipment for electric machines, and more particularly to an improved wire tensioner used for winding coils and for terminating leads of armatures and stators in dynamo-electric machines such as electric motors. Although the invention will be described primarily in the context of its application to electric motor armatures, it will be appreciated that it is equally applicable to rotating rotors in general which are wound with wire for conducting electric current. For convenience, all such rotors are referred to herein as armatures. Also, although the invention will be described primarily in the context of flyer-type armature coil winders, it will be understood that the invention is equally applicable to winders that employ other types of coil wire dispensing members and to stator winders (see, for example, Luciani et al. U.S. Pat. No. 4,858,835, which is hereby incorporated by reference herein).

Flyer-type armature winders for winding coils in the slots of an armature stack and for connecting the leads of the coils to nearby bars of the armature's commutator are well known as shown, for example, by Lombardi et al. U.S. Pat. No. 5,257,745 and Cardini et al. U.S. Pat. No. 5,383,619 (both of which are hereby incorporated by reference herein). A common problem associated with these and other traditional flyer-type winders is instantaneous increases in wire tension during winding which can cause wire breakage. These increases in wire tension cannot be avoided in conventional tensioners and present themselves as a series of peaks with respect to a nominal winding tension being followed by the tensioner.

To reduce the deleterious effects associated with such wire tension peaks, the nominal winding tension is preset by an operator during a set-up stage of the winder to guarantee that the coils being wound have their turns sufficiently taut and well distributed around the armature's stack, without causing excessive strain on the wire as a result of the instantaneous wire tension increases. However, when the operator sets the tensioner so that the wire does not break during the instantaneous increases in tension, most of the wire will be wound with a less than optimal tension level, and the tension peaks will continue to cause sudden and undesirable strain increases in the wire being wound.

With traditional tensioners, the start of winding of a coil (when the flyer is reaching its top speed after having accomplished a lead connection to a commutator bar) is particularly fraught with instantaneous increases in wire tension with respect to he nominal value. If the operator incurs a breakage of the wire during this stage, he proceeds to reset the tensioner to limit the nominal winding tension, and in extreme cases may even reduce the rotation speed of the flyers.

The cause of the instantaneous increases in wire tension is excessive angular movements of the tensioner's dancer arm produced by a pre-loaded spring. As is well known, the dancer arm is present in the tensioner mainly to recover wire (or to maintain tension on the wire) during lead connection stages when the drag of a mechanical/electrical brake (also present in the tensioner) is reduced to favor the required wire delivery from the flyer. More particularly, during these stages the dancer arm moves from a normal angular position which it occupies during winding to a different angular position which produces an increase in the wire path to the flyer. This change in angular position of the dancer arm occurs for a variable time period during sudden inversions in the flyer rotation, during opening of the winding chucks for indexing of the armature, and during manipulation of the wire by the termination equipment. Without the action of the dancer arm, these operations would reduce the wire tension to a point which would make it impossible to guarantee any further control of the wire.

When winding begins for a successive coil following lead connection, the dancer arm remains in a different position with respect to the position it occupied during winding of the previous coil. Only after the drag of the mechanical/electrical brake increases to its nominal level during winding of the successive coil will the dancer arm attempt to reach the position it occupied during winding of the previous coil. Often this position is never reached and the dancer arm instead experiences high dynamic oscillations in position. The different positions occupied by the dancer arm between the winding of different coils, and the presence of the high dynamic oscillations, cause the instantaneous increases in wire tension.

A need therefore exists for methods and apparatus for reducing instantaneous increases in wire tension during the winding of armatures. Such methods and apparatus will reduce detrimental wire tension variations during winding and will allow the nominal wire tension to be the optimal wire tension.

In view of the foregoing, it is an object of this invention to provide methods and apparatus for reducing instantaneous increases in wire tension during the winding of armatures.

Another possible problem with spring-loaded dancer arms is the fact that the nominal position of the dancer arm tends to be quite different during different phases of the operation of the winder. For example, during coil lead connection it is desirable to have relatively low nominal tension in the wire. This allows a spring-loaded dancer arm to move to a nominal position that is very different from its nominal position during coil winding, when it is desirable to have relatively high nominal tension in the wire. It may be difficult to provide a structure which allows the dancer arm to dance freely about two nominal positions that are so different from one another. For example, if the dancer arm spring is adjusted to allow the dancer arm to dance freely about one of these nominal positions, then the dancer arm may contact support structures or other components when it attempts to dance about its other nominal position.

It is therefore another object of this invention to provide dancer arm or similar wire take-up mechanisms that do not necessarily have significantly different nominal positions in response to different nominal wire tensions.

SUMMARY OF THE INVENTION

These and other objects of the invention are accomplished in accordance with the principles of the invention by providing a tensioner for use in an armature winder which significantly reduces instantaneous increases in wire tension during winding and lead connection. Wire from a wire spool is passed over a hysteresis brake to a flyer arm used to wind armatures. To properly direct the wire between the wire spool, brake, and flyer arm, a number of pulley wheels are disposed between these components. In addition to directing the wire, one of the pulley wheels is coupled to a load cell for monitoring wire tension, while another of the pulleys is mounted to a first end of a dancer arm. The dancer arm works in cooperation with the hysteresis brake to regulate the tension of the wire (as described below).

The position of the dancer arm (and thus the tension of the wire to be wound) is controlled with an air cylinder coupled to a second end of the dancer arm by a mechanical linkage (e.g., a piston shaft and a hinged connection). By moving the mechanical linkage, the dancer arm is caused to pivot about a fulcrum axle so that the first end of the dancer arm moves downward when the mechanical linkage is raised and moves upward when the mechanical linkage is lowered.

To control the mechanical linkage's position, a piston located within the air cylinder is attached to the linkage. This piston divides the air cylinder into a top air chamber disposed between the piston and the top of the air cylinder, and a bottom air chamber disposed between the piston and the bottom of the air cylinder. By regulating the pressure in the top air chamber, the piston (and thus the mechanical linkage) may be raised or lowered, causing the first end of dancer arm to be reciprocally lowered or raised. Accordingly, if the drag of the hysteresis brake is kept constant, the wire's tension will be decreased when the first end of the dancer arm is lowered or increased when the first end of the dancer arm is raised. The air pressure within the top air chamber is regulated by a closed-loop proportional valve connected to the top air chamber through a flow valve. This flow valve helps to dampen the movement of the dancer arm.

System controls are provided which regulate the drag of the hysteresis brake, which monitor the wire's tension via the load cell, and which control the pressure within the top air chamber of the air cylinder (to maintain the dancer arm within a proper position range delimited by a first and a second limit sensor coupled to the system controls). Additionally, the system controls monitor wire breakage via a wire breakage detection device (as described below).

In operation, during a lead connection stage of the winder, a low pressure is supplied to the top air chamber of the air cylinder and the drag of the hysteresis brake is reduced (both via commands from the system controls) so that the dancer arm may be raised. This may help maintain sufficient wire tension for the lead connection process. Following lead connection, the winder transitions to a winding stage. During this transition (as well as during the winding stage) a high pressure is supplied to the top air chamber of the air cylinder and the drag of the hysteresis brake is increased. This may lower the dancer arm for the winding process. Following the winding operation, the flyer arm decelerates so that another lead connection may be made. During flyer arm deceleration, the top air chamber pressure is reduced prior to reducing the drag of the hysteresis brake so that the dancer arm maintains its proper position during the deceleration process. Once the flyer arm has decelerated, the drag of the hysteresis brake is reduced as required for lead connection.

As an alternative to raising or lowering the dancer arm for various phases of the operation, the pressure in the air chamber may be adjusted to keep the dancer arm in approximately the same nominal position during various phases, despite significantly different nominal wire tension (produced by the hysteresis brake) in those various phases.

During all winder stages, the pressurized air within the top air chamber opposes sudden changes in dancer arm position in a controlled manner, and dancer arm position is maintained within the position range delimited by the limit sensors through modulation of the closed-loop proportional valve by the system controls. For example, if either limit sensor detects the dancer arm, the system controls may issue a command instructing the closed-loop proportional valve to supply more or less pressure to the top air chamber so that the position of the dancer arm is adjusted accordingly. The flow valve disposed between the closed-loop proportional valve and the top air cylinder dampens oscillations in the position of the dancer arm.

Accordingly, the tensioner of this invention reduces instantaneous increases in wire tension which usually occur in traditional flyer winders during winding and lead connection and which cause wire breakage. By lowering these tension peaks, the nominal tension used to wind armatures may be increased and higher winding speeds may be used. The ability of the tensioner of this invention to lower tension increases at the start of winding (when the flyer is reaching its top speed after having accomplished a lead connection to a commutator bar) is particularly useful as instantaneous tension increases are especially prevalent during this stage in the tensioner's operation.

In addition to reducing instantaneous wire tension increases, the present invention decreases winder down-time associated with wire breakage by including a wire breakage detection device. If wire breakage is detected by the system controls, a rapid discharge valve disposed between the top air chamber of the air cylinder and the closed-loop proportional valve quickly depressurizes the top air chamber. Flyer arm rotation is concurrently halted. In this manner, after wire breakage, winder operation rapidly ceases prior to the wire becoming unthreaded from the flyer arm. This allows winder operation to be restored faster than is possible with traditional winders which become unthreaded following wire breakage.

In another aspect of the invention, dancer arm position measured during a previous winding operation is used to adjust dancer arm position during a current winding operation. For example, limit sensors may provide the system controls with information regarding the number of times and/or the duration that the dancer arm contacts each limit sensor during a winding operation. This information may then be stored by the system controls and used during a subsequent winding operation to control the actuator so as to optimize dancer arm position (i.e., to minimize the number of times and duration that the dancer arm contacts each limit sensor during winding). More generically, an actuator for applying a force to a take-up member to influence the position of the take-up member is provided, along with system controls for controlling the actuator in response to the take-up member's position during a previous winding operation.

In general terms the invention provides apparatus for tensioning wire passing along a path from a wire source to a wire dispenser in a coil winding machine. The apparatus includes a take-up member for contacting the wire between the source and the dispenser and being movable to change the length of the path of the wire between the source and the dispenser. The apparatus further includes a pneumatic actuator for applying a force to the take-up member to influence the position of the take-up member, the force being influenced by pneumatic pressure in the actuator. The apparatus still further includes a pneumatic system for controlling the pneumatic pressure in the actuator in response to a predetermined operating parameter of the coil winding machine. Examples of such operating parameters include the current operating phase that the winder is in (e.g., lead connection phase or coil winding phase), the current tension of the wire in the winder, the past history of movements of the wire take-up member (e.g., most recent contact with a limit sensor, average position during a recent coil winding operation, or history of contacts with limit sensors during a recent coil winding cycle), status of wire (e.g., whether the wire is broken or not), winder speed, winder acceleration/ deceleration, etc.

Further features of the invention, its nature and various advantages, will be more apparent from the accompanying drawings and the following detailed description of the preferred embodiments.

BRIEF DESCRIPTION OF THE DRAWINGS

FIG. 3 is a schematic diagram of a first embodiment of a wire breakage detection device used in the tensioner of FIG. 1.

FIG. 4 is a schematic diagram of a second embodiment of a wire breakage detection device used in the tensioner of FIG. 1.

DETAILED DESCRIPTION OF THE PREFERRED EMBODIMENTS

Figure 1:
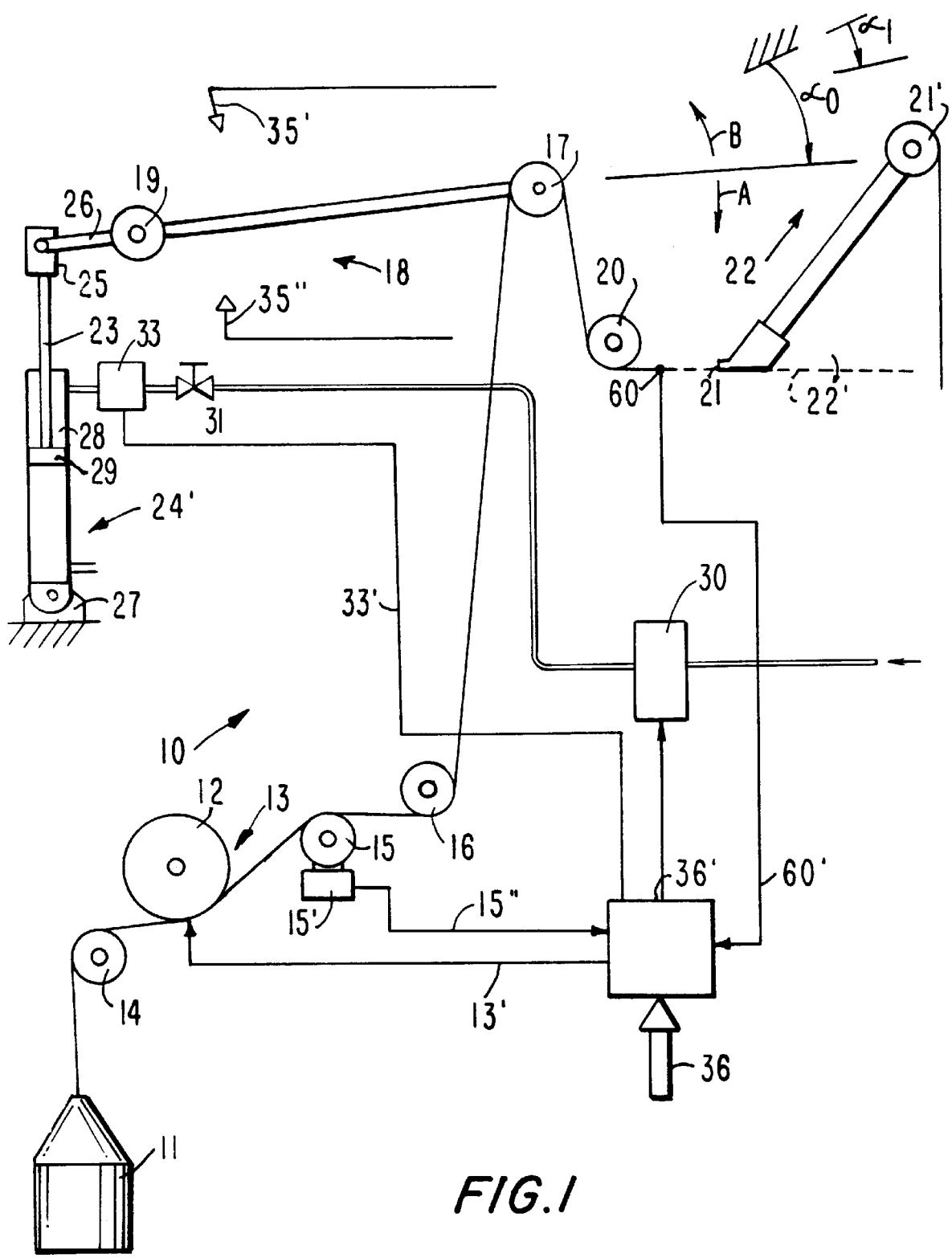
FIG. 1 is a schematic diagram of illustrative wire tensioner apparatus constructed in accordance with this invention.

FIG. 1 shows a schematic view of a tensioner 10 made in accordance with this invention with wire running from a wire spool 11 to a first pulley wheel 12 of a hysteresis brake 13. A second pulley wheel 14 changes the direction of the wire so that it reaches first pulley wheel 12 of hysteresis brake 13 at a certain angle. The drag of hysteresis brake 13 is controlled by a command signal sent over brake bus 13' as described further below. After first pulley wheel 12 of brake 13, the wire runs on a third pulley wheel 15 connected to a load cell 15', load cell 15' measuring the tension being applied to the wire and outputting this information over a tension bus 15". From third pulley wheel 15 the wire is directed by a fourth pulley wheel 16 to a fifth pulley wheel 17 of a dancer arm 18, dancer arm 18 pivoting on a fulcrum axle 19. From fifth pulley wheel 17 of dancer arm 18, the wire travels over a sixth pulley wheel 20 which aligns the wire with an inlet 21 of a flyer arm 22. Once the wire has reached inlet 21, it travels through flyer arm 22 to a seventh pulley wheel 21' (or some other smooth running surface) integral with flyer arm 22 which delivers the wire to an armature (not shown). To deliver wire to the armature, flyer arm 22 rotates around axis 22'.

To control the tension of the wire, dancer arm 18 is connected to shaft 23 of an air cylinder 24 by means of a first hinged connection 25 coupled to a counter-lever extension 26 (of dancer arm 18). Air cylinder 24 comprises a hollow cylinder containing a top air chamber 28 (disposed between a top of air cylinder 24 and a piston 29) and a bottom air chamber 32 (disposed between a bottom of air cylinder 24 and piston 29). The bottom end of air cylinder 24 is hinged by means of a second hinged connection 27 coupled to the frame of tensioner 10. Top air chamber 28 is fed with air (traveling through a flow valve 31 and a rapid discharge valve 33) from a closed-loop proportional valve 30 which regulates the pressure in top air chamber 28 in response to electric command signals sent along control line 30' from system controls 36'. These command signals cause closed-loop proportional valve 30 to modulate (i.e., open and close) to achieve the required pressure in top air chamber 28 with extreme precision. Closed-loop proportional valve 30 is preferably a conventional pneumatic valve which receives a command signal (via control line 30') with a voltage that is proportional to a desired output air pressure from closed-loop proportional valve 30. Closed-loop proportional valve 30 monitors its actual output air pressure with a pressure transducer (not shown), and produces an error signal proportional to the difference between the desired and actual output pressures. This error signal is used to modulate closed-loop proportional valve 30 in such a way that the error signal is minimized, thereby making the actual output pressure substantially equal to the desired output pressure.

Flow valve 31 intersects the air supply between closed-loop proportional valve 30 and top air chamber 28, and the setting of this flow valve is very important for dampening dynamic oscillations of dancer arm 18. By somewhat restricting air flow between closed-loop proportional valve 30 and air cylinder 24, flow valve 31 beneficially slows down the response time of air cylinder 24 to changes in air pressure from closed-loop proportional valve 30 (thereby dampening movements of dancer arm 18). Flow valve 31 may be a manually adjustable valve as only infrequent adjustments to flow valve 31 should be needed. For example, it may be possible to adjust flow valve 31 during initial construction and testing of tensioner 10, and to thereafter operate the system without further adjustment of this valve.

Rapid discharge valve 33, located between top air chamber 28 and flow valve 31 (and controlled via command signals sent over rapid discharge bus 33' by system controls 36'), is needed for reasons which will be explained more fully below.

When air pressure is developed in top air chamber 28 by closed-loop proportional valve 30, any tendency of dancer arm 18 to rotate in direction A to supply more wire to flyer arm 22 (in other words, to respond to a sudden increase in the wire tension) becomes opposed in a controlled manner by the pressure present in top air chamber 28. For the opposite situation, when there is a decrease in wire tension, any tendency of dancer arm 18 to rotate in direction B is facilitated and controlled by the air pressure in top air chamber 28 and by the lack of air pressure in bottom air chamber 32 (as bottom air chamber 32 is kept permanently in a discharge condition toward ambient pressure).

Figure 2A:
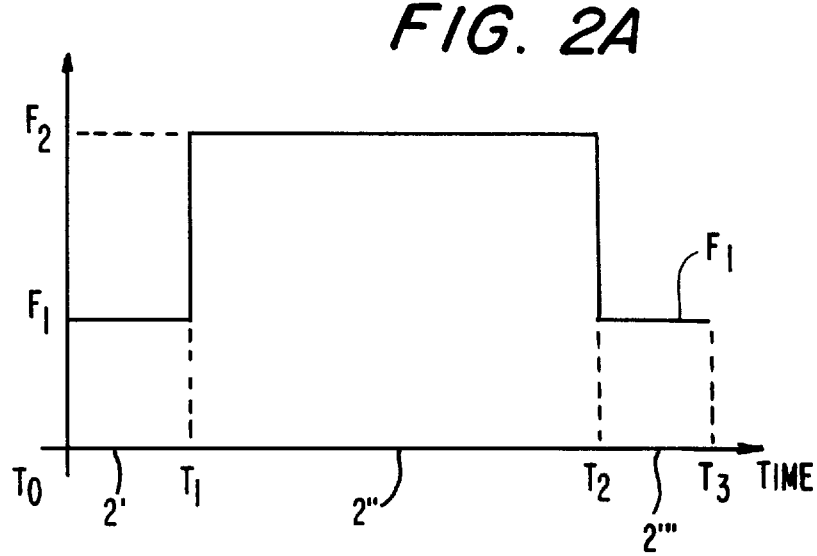
FIG. 2A is a timing diagram of drag force during a lead connection stage, a winding stage, and a subsequent lead connection stage for a hysteresis brake used in the tensioner of FIG. 1.
Figure 2B:
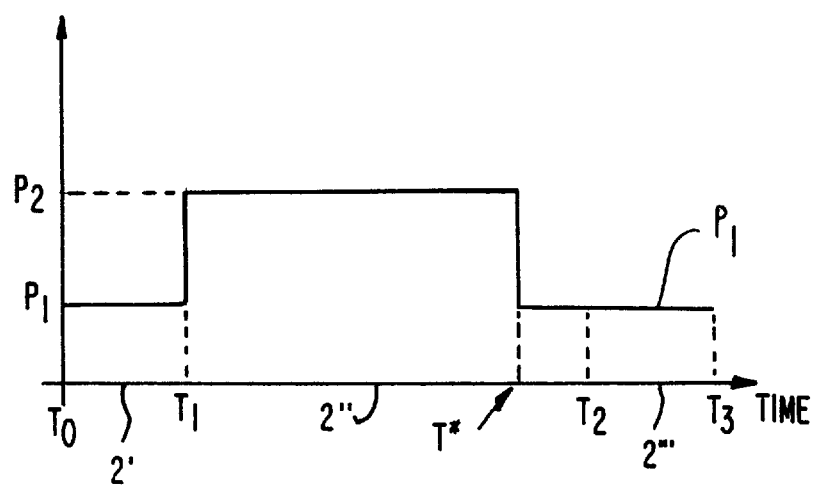
FIG. 2B is a timing diagram of top air chamber pressure during a lead connection stage, a winding stage, and a subsequent lead connection stage for an air cylinder used in the tensioner of FIG. 1.

FIGS. 2A and 2B are timing diagrams of the drag force applied by hysteresis brake 13 and the pressure applied to top air chamber 28 (of air cylinder 24 by closed-loop proportional valve 30) during various stages of tensioner 10's operation, respectively. As depicted in FIGS. 2A and 2B, stage 2' (the time period between times $T_0$ and $T_1$) represents a lead connection stage of the winder, stage 2" (the time period between times $T_1$ and $T_2$) represents a winding stage of the winder, and stage 2''' (the time period between times $T_2$ and $T_3$) represents an immediately successive lead connection stage of the winder. With reference to these graphs, tensioner 10 of the invention is set so that closed-loop proportional valve 30 supplies a low and constant pressure P1 to top air chamber 28 during lead connection stage 2'. At the same time hysteresis brake 13 applies a low drag force F1. Both the drag of hysteresis brake 13 and the pressure in top air chamber 28 are set via command signals from systems controls 36' (the drag of hysteresis brake 13 being adjusted by a command signal sent over tension bus 13' and the pressure of top air chamber 28 being regulated by a command signal sent over control line 30'). With these settings, dancer arm 18 moves from an angular position $\alpha_0$ which it occupied during winding to an angular position $\alpha_1$ so that sufficient wire tension is maintained during lead connection operations. If desired, $\alpha_1$ can be relatively close to or even substantially equal to $\alpha_0$.

At the start of the acceleration ramp (time $T_1$) whereby flyer arm 22 reaches its top speed for winding a subsequent coil, both the drag of hysteresis brake 13 and the pressure in top air chamber 28 increase to F2 and P2, respectively, so that dancer arm 18 returns to angular position $\alpha_0$. Dancer arm 18 returns to the ideal angular position $\alpha_0$ for winding without excessive dynamic oscillations because of the well controlled pressure in top air chamber 28 and the setting of flow valve 31. In this way, the harmful tension increases described previously are significantly reduced. To maintain dancer arm 18 in position $\alpha_0$ during deceleration of flyer arm 22 from the winding speed, the pressure in top air chamber 28 is lowered to value P1 at time T* (the beginning of flyer arm 22's deceleration ramp) prior to lowering the drag of hysteresis brake 13 to drag force F1 as required in the successive lead connection stage 2'''.

In considering the achievements of this invention, it is important to note that the constant pressure applied to top air chamber 28, both during the lead connection stage and during winding, makes dancer arm 18 more stable throughout all the related operations of the winder. That is, even the less detrimental tension variations generated by traditional tensioners are reduced. Furthermore, the presence of modulating closed-loop proportional valve 30 guarantees fast and precise achievement of pressures in top air chamber 28, thereby reducing oscillations in the position of dancer arm 18. In addition, use of proportional valve 30 allows extremely rapid and precise set up of tensioner 10 by simply keying in input values 36 to the system controls 36'.

To further control the position of dancer arm 18, a first limit sensor 35' and a second limit sensor 35" monitor when dancer arm 18 moves out of an angular position range (which these sensors delimit) on either side of normal angular position $\alpha_0$ and notify system controls 36' accordingly via a limit bus (not shown) connected between sensors 35', 35" and system controls 36'. (Limit sensors 35' and 35" may be, for example, limit switches which are activated when contacted by dancer arm 18.) If during winding, sensors 35', 35" signal that dancer arm 18 is beyond the range which they delimit, then closed-loop proportional valve 30 increases or decreases the pressure of the air going to top air chamber 28 (depending on which sensor has been activated) so that dancer arm 18 returns within the delimited range. A program in system controls 36' of tensioner 10 is used to make this determination and to command closed-loop proportional valve 30 accordingly. An operation of this type is particularly necessary when the drag conditions of tensioner 10 change for reasons unrelated to tensioner 10's usual operation (e.g., changes in friction of the pulley wheels, temperature changes of hysteresis brake 13, or after the settings of tensioner 10 have been altered). Maintaining dancer arm 18 within the range delimited by sensors 35', 35" avoids great excursions in the angular position of dancer arm 18 which could bring dancer arm 18 into abutment with the surrounding structure. It also guarantees that dancer arm 18 remains very near to the $\alpha_0$ angular position which develops correct tensioning as described above.

System controls 36' of tensioner 10 may also be programmed to check limit sensors 35', 35" for the position of dancer arm 18 at every start of the winder after the winder has been inoperative for long time periods. Inoperative conditions tend to change the drag of hysteresis brake 13 and the friction of the pulley wheels, at least during a first period of operation of the winder. Therefore, dancer arm 18 may be beyond the range delimited by first limit sensor 35' and second limit sensor 35". Consequently, system controls 36' may be further programmed to alter the pressure of top air chamber 28 to bring dancer arm 18 within the required range right from the first period of operation of the winder.

In another aspect of the invention, system controls 36' use dancer arm 18 position information measured during a previous winding operation to adjust the position of dancer arm 18 during a current winding operation. This dancer arm 18 position information may include the number of times and/or the duration that dancer arm 18 contacted limit sensor 35' and limit sensor 35" during the previous winding operation. The position information may be stored by system controls 36' or by some other storage means and used to optimize the position of dancer arm 18 via closed-loop proportional valve 30 (so as to minimize the number of times and the duration that dancer arm 18 contacts either limit sensor 35' or limit sensor 35"). Optimized dancer arm 18 position ensures correct wire tensioning during winding.

In addition to reducing instantaneous increases in wire tension, the present invention reduces winder down-time should wire breakage nonetheless occur. A wire breakage detection device 39 (described below with reference to FIGS. 3 and 4) detects wire breakage and signals system controls 36' of the breakage. System controls 36' then cause (via rapid discharge bus 33') rapid discharge valve 33 to discharge the pressure in top air chamber 28 extremely rapidly, and concurrently cause flyer arm 22 to stop rotating. By doing this, any further oscillation of dancer arm 18 about position $\alpha_0$ is reduced and a withdrawal of the wire passing through flyer arm 22 due to the wire breakage can be avoided. In this way, after a wire breakage, an operator will find the wire still threaded through flyer arm 22 so that the down time required to reset the winder is minimized. In contrast, with traditional tensioners, wire breakage causes the dancer arm to rotate suddenly in direction B due to the motivation of a pre-loaded spring. This can cause the wire to withdraw from the flyer arm and may even cause the wire to run off the pulley wheels of the tensioner. Either scenario obviously requires lengthy intervention by the operator to restore the tensioner to its working condition.

FIG. 3 shows a wire breakage detection device 39 which is able to rapidly determine when a wire breakage occurs and to signal such an occurrence to system controls 36' of tensioner 10. System controls 36' may in turn cause rapid discharge valve 33 to rapidly discharge top air chamber 28 as previously described.

Referring to FIG. 3, a ceramic head 40' of a microphone 40 acts as a running surface for the wire (wire 9 in FIG. 3) traveling from wire spool 11 to flyer arm 22. Microphone 40 produces a sound signal which corresponds to the noise produced by the wire running on ceramic head 40'. This sound signal is fed to and analyzed by circuitry 41. Circuitry 41 includes a gain amplifier 42 for amplifying the sound signal produced by microphone 40, a band-pass filter 43 for excluding background noises from the amplified sound signal, and a rectifier 44 for rectifying the filtered sound signal to produce a "converted" sound signal. From rectifier 44, the converted sound signal enters a comparison unit 45 which compares the converted sound signal to a reference sound signal 46 and produces an error signal 47 based on the comparison. Reference sound signal 46 corresponds to a converted sound signal produced by a wire running perfectly on ceramic head 40' of microphone 40.

Error signal 47 is output to system controls 36' of tensioner 10 which trigger rapid discharge valve 33 (as described previously) if a wire breakage is detected. That is, if error signal 47 exceeds a certain limit, system controls 36' of tensioner 10 trigger the discharge of top air chamber 28 by rapid discharge valve 33 and stop flyer arm 22 in order to avoid a sudden oscillation of dancer arm 18 which would withdraw the wire from flyer arm 22 and cause the wire to run off the pulley wheels of tensioner 10.

FIG. 4 shows a second embodiment for a wire breakage detection device which may be used with tensioner 10. In this embodiment, an antenna 50 with antenna arms 50' partially surrounds the running wire 9. As wire 9 runs within the area between antenna arms 50', an electrical "pick-up" signal is produced via electrostatic generation. Wire breakage can be detected because the electrostatic generation resulting when wire 9 runs through antenna arms 50' is different from the electrostatic generation resulting when the wire is stationary or missing. Circuit 51, which is very similar to circuit 41 (similar components are referenced with the same second digit), amplifies the pick-up signal with an amplifier 52, filters the amplified pick-up signal with a band-pass filter 53 (to eliminate electrostatic disturbances picked up by antenna 50), and rectifies the filtered, amplified pick-up signal with a rectifier 54 to produce a "converted" pick-up signal. This converted pick-up signal then enters a comparison unit 55 which compares the converted pick-up signal to a reference pick-up signal 56 and produces an error signal 57 based on the comparison. Error signal 57 is then fed to system controls 36' which may trigger rapid discharge valve 33 when there is a drop in the signal produced by antenna 50 (due to a wire breakage). Note that either microphone 40 or antenna 50 may be placed in a position 60 (FIG. 1) to detect a wire breakage when using tensioner 10.

Figure 1A:
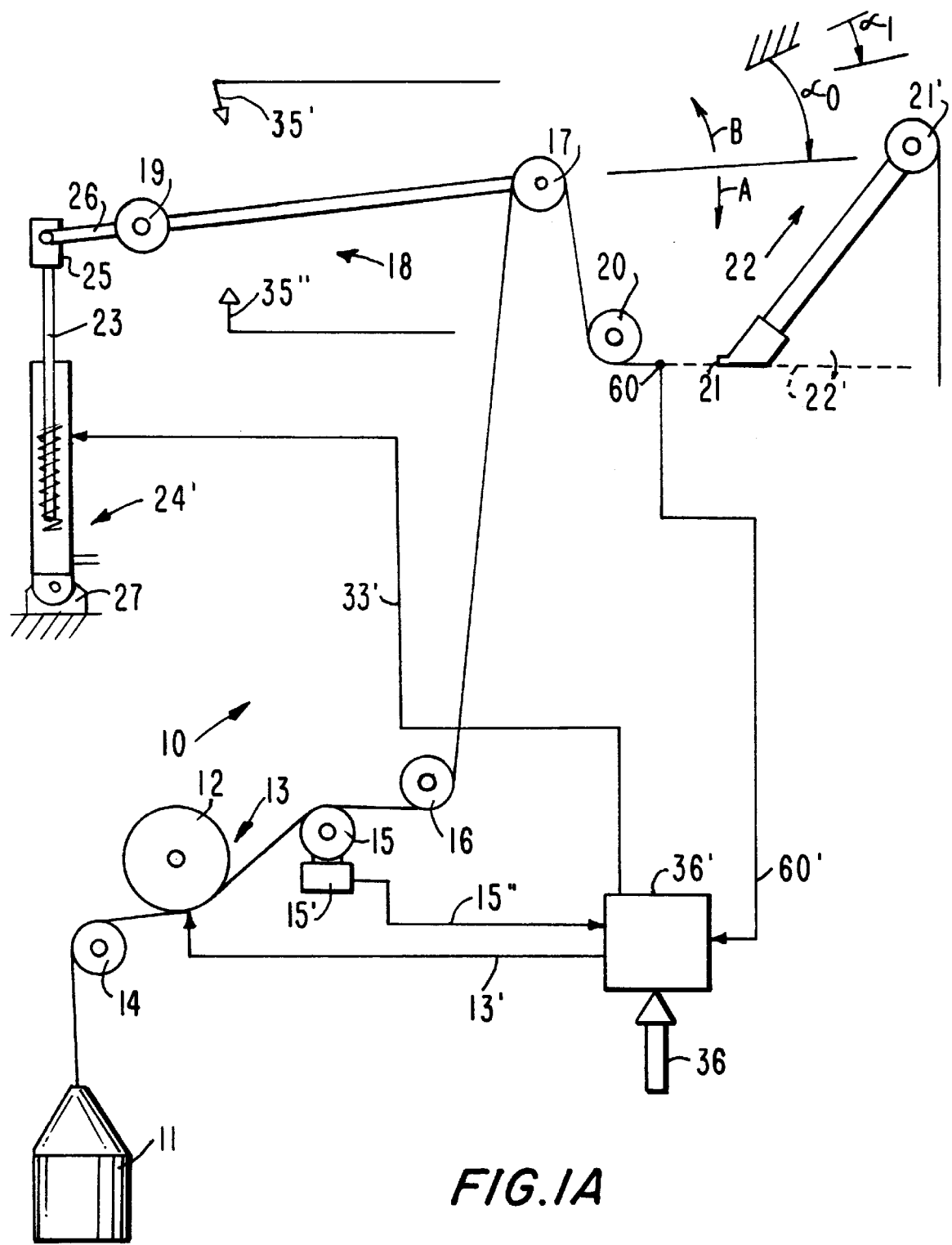
FIG. 1A is a schematic diagram of an alternative embodiment of an illustrative wire tensioner apparatus constructed in accordance with this invention.

It will be understood that the foregoing is only illustrative of the principles of this invention, and that various modifications can be made by those skilled in the art without departing from the scope and spirit of the invention. For example, while closed-loop proportional valve 30 is preferably a pneumatic valve, any other flow control valve or mass flow controller may be similarly employed. Other valves types may also be used for flow valve 31 and rapid discharge valve 33. Further, system controls 36' may be embodied in hardware, software, or some combination thereof. Limit sensors 35' and 35" may take many forms including switches, motion sensors, or any other position monitoring means, and a wide variety of wire breakage detection devices may be used for wire breakage detecting device 39. As an alternative to limit sensors 35' and 35", other types of position sensors may be used. For example, photo-electric cells may detect various positions of dancer arm 18, or a linear or rotary potentiometer may be operated by the dancer arm to provide a more continuous output indication of dancer arm position. While the use of a pneumatic actuator for controlling dancer arm 18's position is preferred, any other actuator (e.g., an electromagnetic actuator 24' see FIG. 1A) may be similarly employed and similarly controlled by system controls 36'.

The invention claimed is:

1. Apparatus for tensioning wire passing along a path from a wire source to a wire dispenser in a coil winding machine comprising:
    a take-up member for contacting the wire between the source and the dispenser and being movable to change the length of the path of the wire between the source and the dispenser;
    a pneumatic actuator for applying a force to said take-up member to influence the position of said take-up member, said force being influenced by pneumatic pressure in said actuator;
    at least one sensor for sensing a predetermined operating parameter of said coil winding machine;
    a controller for receiving signals from said at least one sensor and for producing control signals in response thereto for controlling said pneumatic system; and
    a pneumatic system for controlling the pneumatic pressure in said actuator in response to said control signals.

2. The apparatus of claim 1, wherein said take-up member comprises a dancer arm on which is mounted a pulley.

3. The apparatus of claim 1, wherein said take-up member is a dancer arm and is coupled to said pneumatic actuator.

4. The apparatus of claim 1, wherein said at least one sensor comprises a plurality of limit sensors for producing control signals when said take-up member moves beyond predetermined set points.

5. The apparatus of claim 1, further comprising:
    a hysteresis brake for exerting on said wire a variable force in response to a signal from said controller; and
    a load cell for detecting tension on said wire, producing a variable signal in response to variations in said tension, and sending said variable signal to said controller.

6. The apparatus of claim 1, wherein said pneumatic system comprises a proportional valve capable of providing, in response to a variable signal from said controller, a variable flow of air to said pneumatic actuator.

7. The apparatus of claim 1, further comprising a sensor for measuring a change of speed of said wire and for sending to said controller an electrical signal indicating a sudden change in the speed at which said wire passes from said wire source to said wire dispenser.

8. The apparatus of claim 1, further comprising a valve for rapidly releasing pressure from the pneumatic actuator in response to a control signal.

9. The apparatus of claim 1, wherein said pneumatic actuator comprises a cylinder and piston assembly.

10. Apparatus for tensioning wire passing along a path from a wire source to a wire dispenser in a coil winding machine comprising:
    a take-up member for contacting the wire between the source and the dispenser and being movable to change the length of the path of the wire between the source and the dispenser;
    an actuator for applying a force to said take-up member to influence the position of said take-up member; and
    system controls including:
    at least one sensor for monitoring position of said take-up member, and
    memory for storing data from said at least one sensor regarding position of said take-up member over a plurality of winding operations,
    said system controls controlling said actuator during a current one of said winding operation in response to data stored in said memory regarding position of said take-up member during a previous one of said winding operations.

11. The apparatus of claim 10 wherein said actuator is an electromagnetic actuator.

12. The apparatus of claim 10 wherein said actuator is a pneumatic actuator.

13. The apparatus of claim 10, wherein said position sensors are limit sensors.

* * * * *